(12) United States Patent
Hardgrove et al.

(10) Patent No.: US 6,277,319 B2
(45) Date of Patent: *Aug. 21, 2001

(54) METHOD FOR TRIMMING SHAPED PLASTIC WORKPIECES

(75) Inventors: William H. Hardgrove, Englewood; Michael A. Swartz; Andrew G. Yorde, both of Brookville, all of OH (US)

(73) Assignee: Green Tokai Co., Ltd., Brookville, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,744

(22) Filed: Feb. 19, 1999

(51) Int. Cl.[7] .................................................. B23K 26/16
(52) U.S. Cl. .......................... 264/400; 264/101; 264/102; 219/121.69; 219/121.86
(58) Field of Search .................................. 264/400, 145, 264/146, 161, 162, 102, 101; 219/121.67, 121.68, 121.69, 121.86

(56) References Cited

U.S. PATENT DOCUMENTS

| | | | |
|---|---|---|---|
| 3,706,173 | * 12/1972 | Taylor | 52/717.03 |
| 4,465,919 | * 8/1984 | Roder | 219/121.67 |
| 4,539,463 | 9/1985 | Piccioli et al. | 219/121 |
| 4,851,061 | * 7/1989 | Sorkoram | 156/63 |
| 4,897,520 | * 1/1990 | Carter et al. | 219/121.68 |
| 4,918,611 | 4/1990 | Shyu et al. | 36/474.08 |
| 5,038,015 | * 8/1991 | Einav et al. | 219/121.78 |
| 5,106,288 | 4/1992 | Hughes | 425/174.4 |
| 5,169,787 | * 12/1992 | Blaimschein | 83/465 |
| 5,187,967 | * 2/1993 | Singh et al. | 72/340 |
| 5,227,608 | * 7/1993 | Yoshida et al. | 219/121.68 |
| 5,262,612 | 11/1993 | Momany et al. | 219/121.67 |
| 5,362,941 | * 11/1994 | Johnson et al. | 219/121.84 |
| 5,380,978 | * 1/1995 | Pryor | 219/121.64 |
| 5,407,415 | * 4/1995 | Spishak | 483/4 |
| 5,431,865 | 7/1995 | Quin | 264/40.1 |
| 5,466,909 | 11/1995 | Nihei et al. | 219/121.72 |
| 5,478,426 | 12/1995 | Wiler et al. | 156/272.8 |
| 5,487,852 | 1/1996 | Ludden et al. | 264/400 |
| 5,514,427 | 5/1996 | Ellison et al. | 428/31 |
| 5,599,608 | 2/1997 | Yamamoto et al. | 428/192 |
| 5,658,476 | * 8/1997 | Gullo et al. | 219/121.86 |
| 5,698,121 | 12/1997 | Kosaka et al. | 219/121.67 |
| 5,738,367 | * 4/1998 | Zichichi et al. | 280/728.3 |
| 5,744,776 | * 4/1998 | Bauer | 219/121.7 |
| 5,746,962 | 5/1998 | Yamamoto | 264/266 |
| 5,783,287 | 7/1998 | Yamamoto et al. | 428/192 |
| 5,883,356 | * 3/1999 | Bauer et al. | 219/121.62 |
| 5,954,898 | * 9/1999 | McKague et al. | 156/64 |
| 6,046,427 | * 4/2000 | Richter et al. | 219/121.67 |
| 6,064,035 | * 5/2000 | Toller et al. | 219/121.86 |

OTHER PUBLICATIONS

Printed copy of www.synrad.com, Synrad, Inc., Jul. 16, 1998, 7 pages.

* cited by examiner

*Primary Examiner*—Jan H. Silbaugh
*Assistant Examiner*—Stefan Staicovici
(74) *Attorney, Agent, or Firm*—Biebel & French

(57) ABSTRACT

A method and apparatus for laser trimming a shaped plastic workpiece use a laser beam positioned and directed by a robotic arm traveling along a pre-programmed path to trim the edges of a workpiece held against a positioning block. Preferably, the positioning block includes a laser beam capturing channel comprising suction holes for removing smoke generated by the ablation and burning of the plastic so as to minimize the risk of smoke damage to the workpiece and to remove soot and vapors from the work area. At the same time, laser beams are inhibited form reflecting back off the block onto the workpiece by positioning the channel under the workpiece and along the predetermined cutting path.

1 Claim, 7 Drawing Sheets

METHOD FOR TRIMMING SHAPED PLASTIC WORKPIECES

FIELD OF THE INVENTION

The present invention pertains to a method and apparatus for trimming a shaped plastic workpiece such as a paint film laminate that is to be used to form an injection molded automotive or truck part. The method uses a laser beam positioned and directed by a robotic arm along a pre-programmed path to trim the edges of the paint film laminate workpiece as the workpiece is held against a positioning block.

BACKGROUND OF THE INVENTION

A variety of injection molded parts are made and used for automobile body and trim parts. For example, bumpers, spoilers, body panels, doors, filler panels, wheel covers, dashboards, arm rests and other parts are commonly made by the injection molding of thermoplastic materials.

In order to provide a painted or other decorative surface for injection molded plastic trim parts, film lamination techniques are commonly employed. A paint film laminate is insert molded or, as it is sometimes referred to, co-molded, with the desired thermoplastic to fuse the film over the injection molded substrate. The resulting injection molded film-plastic part is ready for assembly without subsequent painting.

The paint film laminate used in these insert molding techniques may comprise a backing sheet to which paint, other pigment-containing, or clear layers are adhered. Typically, the backing sheet comprises an extruded thermoplastic sheet. The paint or pigment layer may contain colored pigments or reflective flake pigments such as aluminum or mica flakes to provide for example a metallic finish.

The paint film may consist of a monocoat; a clear coat over a base coat; or a clear coat and a base coat with interposed print or design. The paint film, including base coat, clear coat and print or design, if desired, may range from about 0.5–4 mil. (13–100 $\mu$m) in thickness.

Laminated paint films are well known in the art and are available, for example, from Avery Dennison Decorative Films Div. of Schererville, Ind., or Rexham Decorative Products of Charlotte, N.C. For example, laminated paint films are described in U.S. Pat. No. 5,514,427, the disclosure of which is incorporated herein by reference. The films are typically provided in a roll, unwound and then "preformed" to a size and shape approximating that of the final injection molded film-plastic part.

The paint film laminate preform is next usually trimmed and placed along the cavity side of an injection mold with the painted side or "show" side thereof facing the mold cavity surface. Trimming may be accomplished by hand or in some instances by the use of heavy stamping machines that require the use of expensive tooling.

After trimming, the paint film laminate preform is ready for the molding process where it may be placed along the core side of the mold. The mold is then clamped and the desired molten resin is injected into the mold cavity. Heat and pressure conditions in the mold partially melt the backing sheet and a melt bonding or fusion of the injected resin and the backing sheet of the film occur. Injection molds used for these processes are rear or edge gated so that the molten resin is directed along the backside of the film.

Techniques for preforming paint film laminates and insert molding film-plastic parts are disclosed in U.S. Pat. Nos. 5.599,608; 5,759,477; and 5,783.287. The disclosure of these patents is incorporated herein by reference.

While the prior art process described above has proven effective in many respects, there is a need in the art to improve upon the trimming step for the paint film laminate so that this operation can be conducted economically and more accurately. At the same time, it is desirable to minimize the use of heavy stamping or cutting machines that require large spatial areas and expensive cutting tools and dies.

It is even more desirable to provide a laser trimming operation wherein operation of the laser is conducted in an enclosed atmosphere, shielding workers from the laser beam and from soot and vapors that emanate from the cutting operation. Another desirable goal is to provide an automated laser trimming apparatus wherein soot and vapors from the laser cutting area are immediately removed from the trimming area to a bag house or other filter mechanism and wherein the trimmed workpiece does not contain burned or charred areas surrounding the laser trimming line.

SUMMARY OF THE INVENTION

These and other objects are met by the paint film laminate trimming apparatus and process of the present invention. Basically, the apparatus comprises a rotatable wall carrying a work platform with the platform including a plurality of convex positioning blocks mounted thereon. Each positioning block is contoured to correspond in shape and dimension to a desired work piece such as an automobile or truck trim part.

In a first work station, the operator, which can include manual or robotic means, loads a plurality of "preformed" and roughly trimmed paint laminate films over each of the positioning blocks. The roughly trimmed paint films are dimensioned so that they snugly fit over the corresponding positioning blocks. After all of these paint films are properly positioned over their corresponding positioning blocks, the wall and associated platform are rotated to an enclosed work chamber wherein a laser performs a final, highly accurate trimming of the paint laminate films.

In the laser cutting operation, X, Y, and Z coordinates of the desired cutting pattern are contained in the memory of a microprocessor. The microprocessor then provides this information to a laser controller which in turn moves the laser along the desired cutting pattern to finally trim the paint film laminates, each of which is positioned on its associated positioning block.

The positioning blocks each include a plurality of suction ports positioned along the path of travel of the laser. These ports communicate with a manifold and plenum chamber so that a suction source in operative association with the manifold and plenum chamber draws particulates and vapors from the laser cutting area to a bag house or other effective filter mechanism. This suction action also helps to grip or secure the paint film laminate to the positioning blocks.

The laser includes a source that generates a laser beam which is used to cut the workpiece along the path of travel. The projector is in optical communication with the laser source, preferably through a flexible or jointed optical conductor, so that the projector receives the laser beam from the laser source and projects it onto the workpiece positioned on one of the convex positioning blocks.

The robot positions and orients the projector to direct the laser beam toward the convex positioning block and workpiece mounted thereon. A channel or groove is formed in the positioning block and extends substantially parallel to the desired cutting line. The laser photons pass through the workpiece providing a clear cut therein and then terminate in the channel without reflecting out of the channel onto the back of the workpiece.

Most preferably, the robot includes a first arm or spar having proximal and distal ends. The spar includes a wrist portion near its proximal end on which the projector is mounted. The robot also includes a second arm or boom having a proximal end pivotally supported by a base. The boom has a distal end near which the boom pivotally supports the proximal end of the spar.

The controller electrically communicates with robot electric motors positioned near the wrist portion as well as near the proximal ends of the spar and the boom to enable the robot to move the projector so that the laser beam traces the path of travel programmed into the controller. Most preferably, the controller signals the robot electric motors to orient the projector so that the laser beam remains normal to the tangent of the path of travel and maintains a constant angle with a plane containing that path as the laser beam traces the path.

The invention will be further described in conjunction with the attached drawings and in the ensuing detailed description.

DETAILED DESCRIPTION OF THE PREFERRED EMBODIMENT(s)

Figure 1:
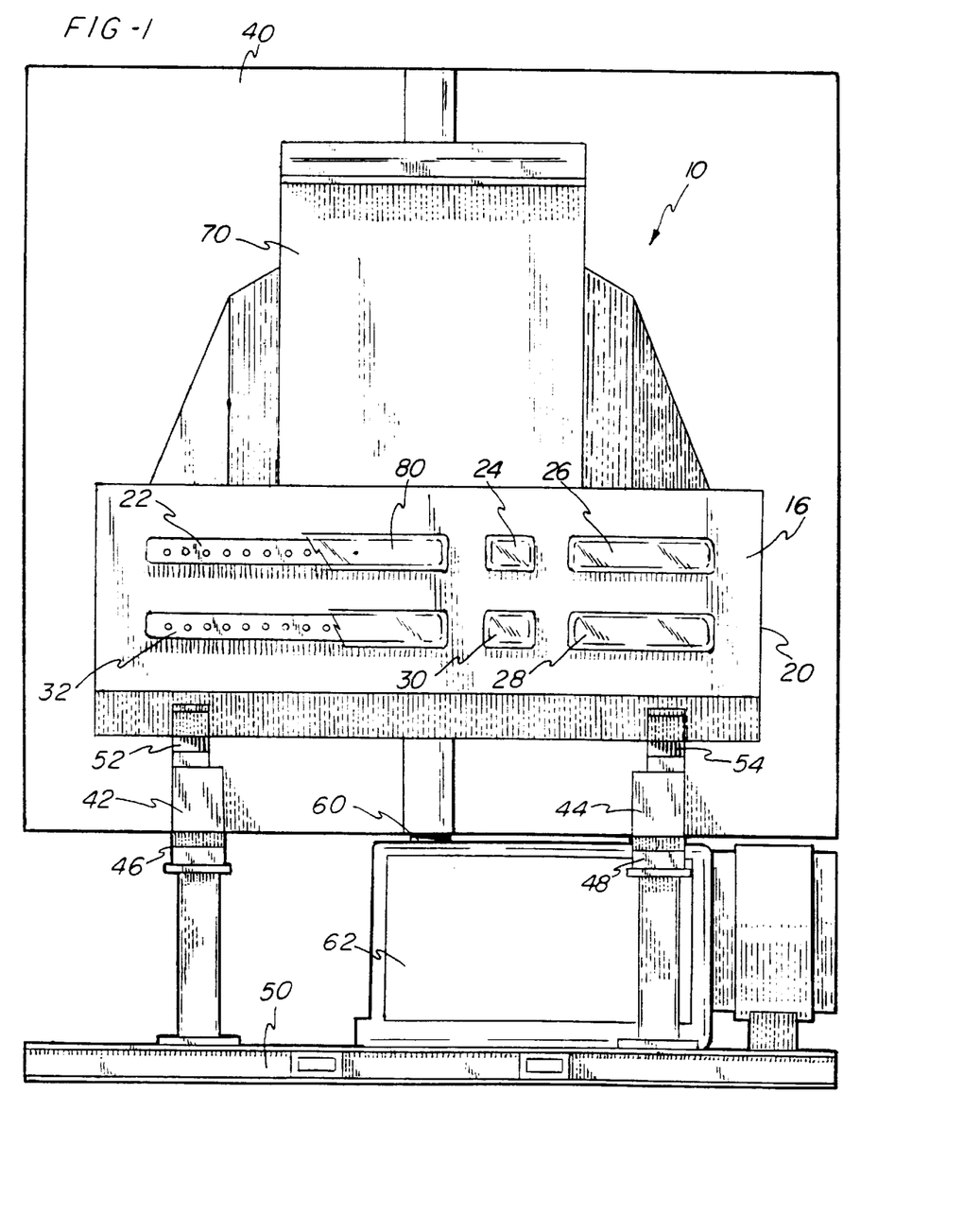
FIG. 1 is a side elevational view of a rotatable laser cutting unit according to the present invention.

As shown in FIG. 1, a laser cutting unit 10 in accordance with the invention includes a metallic work platform 16 carrying a plurality of convex positioning blocks 22, 24, 26, 28, 30 and 32 thereon. The work platform 16 is attached to rotatable wall 40 by horizontal truss members 42, 44 with mounting brackets 52, 54 respectively formed in the trusses for fixed mounting of the bottom portion of work platform 16 therein.

The work platform 16 and wall 40 may be rotated by rotatable shaft 60 that is driven by electric motor 62. As shown in FIG. 1, the proximal ends of the trusses 42, 44, in this position, rest upon stationary legs 46, 48 that are in turn fixed to stationary base 50. Accordingly, the entire wall 40, associated work platform 16, and trusses 42, 44 are positioned for rotation between: (1) a loading and unloading station and (2) a laser trimming station, as shall be explained hereinafter.

The unit 10 includes an air manifold 20 (best shown in FIG. 2) formed by the interior housing of platform 16. The manifold communicates with chamber 70, with both the manifold and chamber being operatively connected to a vacuum source (not shown). Air, gases and soot that are present near the platform are drawn via the action of the vacuum source, through the manifold and chamber to a bag house or other air cleaning device (not shown).

Figure 2:
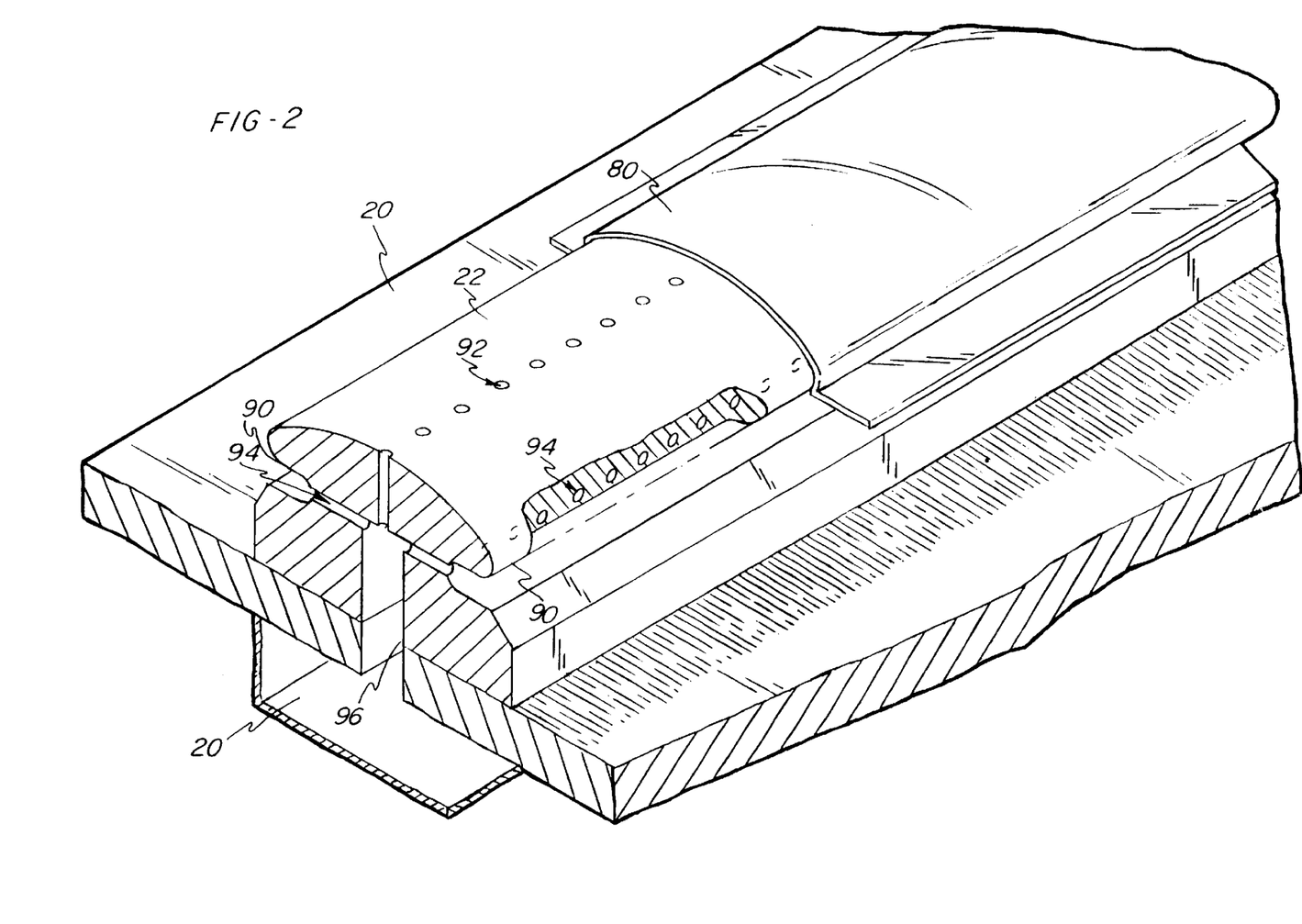
FIG. 2 is a perspective view of a convex positioning block for the laser cutting unit of FIG. 1, partially cut away along the line 2—2 in FIG. 1 to show suction ports opening through the surface of the block.

Each of the convex positioning blocks 22, 24, 26, 28, 30, 32 has an outer contour complementary to the contour of the concave workpiece 80 which it is desired to trim. As shown in FIG. 2, the block 22 includes a peripheral groove 90; a series of hold down ports 92 and a series of suction ports 94 communicating with a plenum 96, the manifold 20 and ultimately with chamber 70. Each convex positioning block 22, 24, 26, 28, 30, 32 is provided with an associated plenum 96 that in turn communicates with the manifold 20.

The hold down ports serve primarily to secure the workpiece 80 against the block 22. The suction ports 94 serve primarily to draw gases and soot evolved from the burning or ablation of the workpiece 80 into the plenum 96. The suction ports 94 preferably are larger in diameter than the hold down ports 92 so as to draw a greater volume flow of air from into the plenum 96 from the vicinity of the groove 90.

Figure 3:
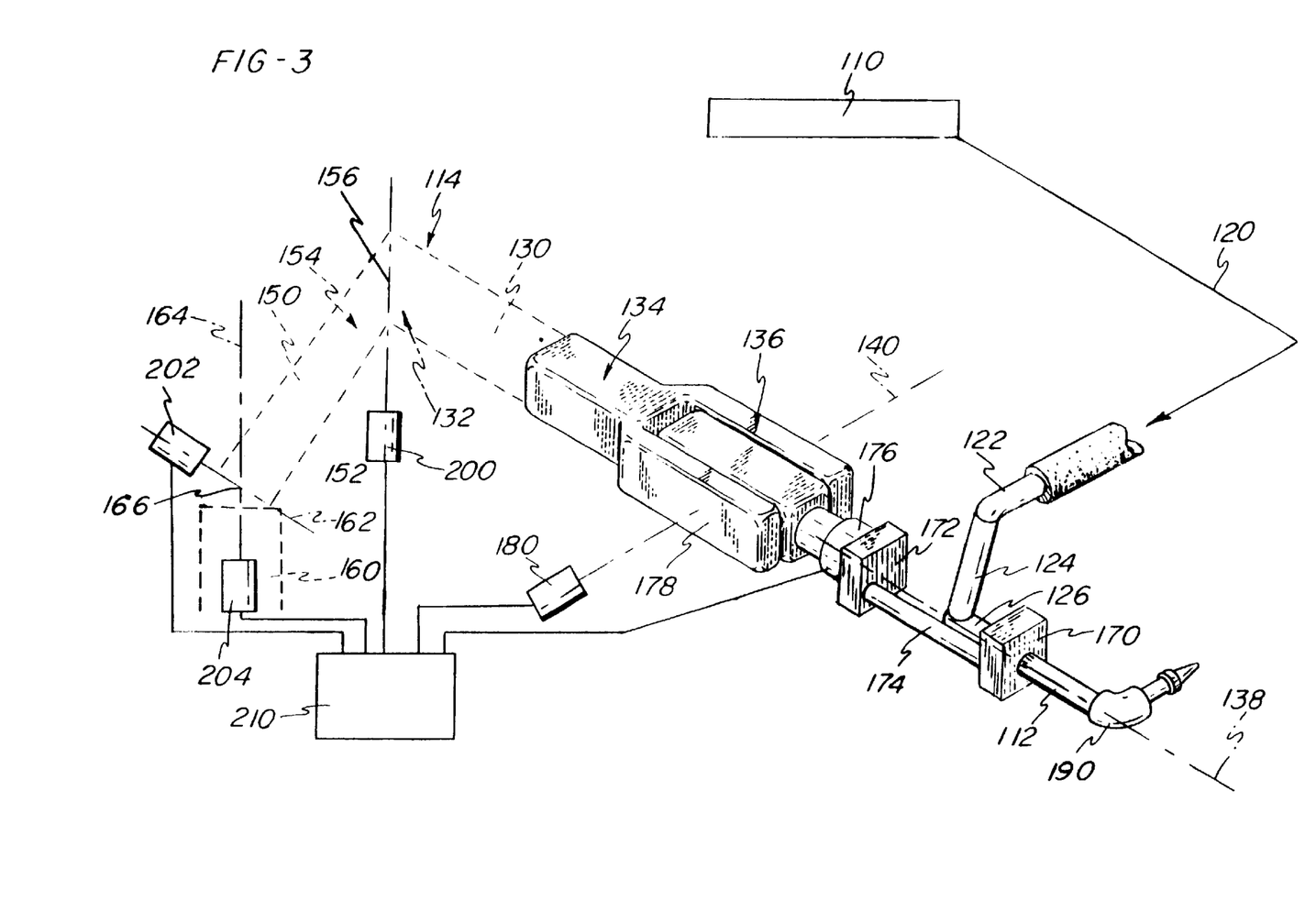
FIG. 3 is a schematic view showing a laser projector for use with the laser cutting unit of FIG. 1 mounted on a robotic arm.

When the rotatable wall and associated work platform are rotated to the laser trimming station, the workpiece 80 is trimmed by means of a laser beam which is generated by a laser source 110 (FIG. 3) and projected against the workpiece 80 by means of a projector 112 (FIG. 3). As shown in FIG. 3, the projector 112 is mounted on a robot 114. The robot 114 is programmed to move the projector 112 so that the laser beam projected by the projector 112 traces a path of travel near the periphery of the workpiece 80.

The preferred laser source 110 is a 200 W laser available from Synrad, Inc. of Mukilteo, Wash. Preferably, the source 110 itself remains stationary on a shelf (not shown) positioned above the laser cutting unit 10 (FIG. 1). The laser beam generated by the source 110 is transmitted to an optical conduit 120 which, in turn, conducts the beam to the projector 112. The optical conductor 120 includes a series of pivotally coupled sections 122, 124 and 126 which allow the robot 114 to translate and re-orient the projector 112 so as to direct the laser beam onto the workpiece 80 (FIG. 2).

The preferred robot 114 is available from FANUC Robotics Corp. of Auburn, Mich. It includes a spar or first robotic arm (shown in phantom at 130) having a proximal end 132 and a distal end 134. A wrist portion 136 near the distal end 134 of the spar 130 supports the projector 112 for pivotal movement around a first pivot axis 138 and a second pivot axis 140. The robot 114 also includes a boom or second robotic arm 150 (shown in phantom) having a proximal end 152 and a distal end 154. The boom 150 supports the proximal end 132 of the spar 130 near its distal end 154 for pivotal movement around a third pivot axis 156. In addition, the robot 114 includes a base 160 (shown in phantom) which supports the proximal end 152 of the boom 150 for pivotal movement around a fourth pivot axis 162 and a fifth pivot axis 164, which intersect at a pivot point 166.

The wrist portion 136 includes a pair of blocks 170 and 172; a link 174; a first robot electric motor 176; a yoke 178 affixed to the spar 130 and a second electric motor (shown schematically at 180). The projector 112 is directly supported by the block 170. The blocks 170, 172 are connected by the link 174 eccentrically to the first pivot axis 138. The block 172 is mounted on a drive shaft (not shown) of the first robot electric motor 176 so as to cause the first robot electric motor 176 to pivot the projector 112; the blocks 170, 172; and the link 174 as a unit relative to the first pivot axis 138. The projector 112 itself includes an elbow 190 to direct the laser beam at an angle transverse (preferably perpendicular) to the first pivot axis 138.

The first robot electric motor 176 itself is supported by the yoke 178. The second robot electric motor 180 is housed within the yoke 178 so as to enable the second robot electric motor 180 to pivot the first electric motor 176 (and the direction of the first pivot axis 138) relative to the second pivot axis 140.

A third robot electric motor (shown schematically at 200) is housed within the distal end 154 of the boom 150 to cause the spar 130 to pivot relative to the third pivot axis 156. Fourth and fifth robot electric motors (shown schematically at 202 and 204) are housed within the base 160 to cause the boom 150 to pivot relative to the fourth and fifth pivot axes 162, 164, that is, relative to the pivot pint 166.

A controller 210, which is preferably a microprocessor, is in electrical communication through means well known to those of ordinary skill in the art with the robot electric motors 176, 180, 200, 202, 204 so as to induce the robot electric motors 176, 180, 200, 202, 204 to move the projector 112 so that the laser beam traces a path of travel (212 in FIG. 4) programmed into the controller 210.

Figure 4:
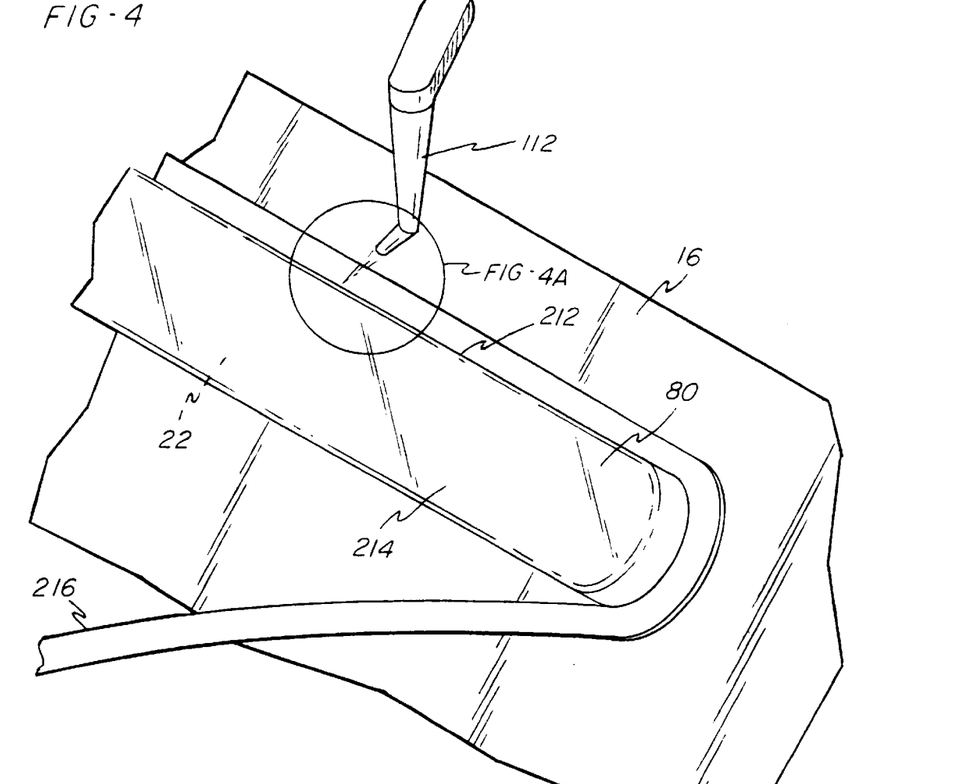
FIG. 4 is a schematic view of the laser projector of FIG. 3 trimming a paint film laminate workpiece.

Referring next to FIG. 4, a preferred method for trimming a plastic workpiece 80 begins by mounting the workpiece 80 on one or more of the convex positioning blocks (only block 22 shown in FIG. 4) so the path 212 along which the workpiece 80 is to be trimmed lies adjacent the peripheral groove 90. At least a partial vacuum is drawn through the plenum 96 (FIG. 2) and the hold down ports 92 (FIG. 2) of the block 22 to secure the workpiece 80 to the block 22. Next, the path of travel 212 is programmed into the controller 230 (FIG. 3). The controller 230 induces the robot electric motors 176, 180, 200, 202, 204 to move the projector so that the laser beam traces the path of travel 212 to separate a first portion 214 of the workpiece 80 from a second (scrap) portion 216. Preferably, the laser beam is directed normally to a tangent of the path of travel 212 and at a constant angle with the plane of the work platform 16. As the laser beam cleanly cuts the workpiece 80, gases and soot generated by the process are removed through the suction ports 94 (FIG. 2). When the first and second portions 214, 216 of the workpiece 80 have been completely separated, the vacuum drawn through the plenum 96 is released so that the first portion 214 of the workpiece 80 can be removed.

Figure 4A:
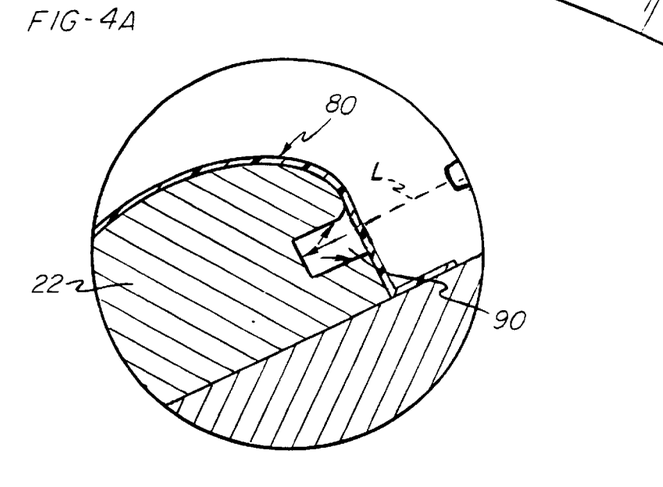
FIG. 4a is a magnified schematic view of the cutting area showing the laser photons cutting the workpiece and then terminating in the channel formed in the positioning block.

FIG. 4A schematically depicts another important aspect of the invention and shows an example of how the invention helps to minimize burned or charred areas that in some prior art methods may be left along the laser cut line. Here, the laser beam L is shown penetrating the workpiece 80, typically a paint film as the film is positioned over the block 22. The laser beam impinges on the film at an approximate right angle, passes through the workpiece to provide a clean cut, and extends into the depth of the peripheral groove 90 formed in block 22. The depth of the groove 90 is dimensioned so that the photons or beams L are totally captured within the groove 90 and do not rebound off the block 22 back into the underside of the workpiece 80. In contrast, in some prior art methods that do not employ a photon capturing groove 90 contiguous to the cut line, the laser photons bounce off a background substrate and re-enter the workpiece adjacent the cut line resulting in charring or burning of the part.

Figure 5:
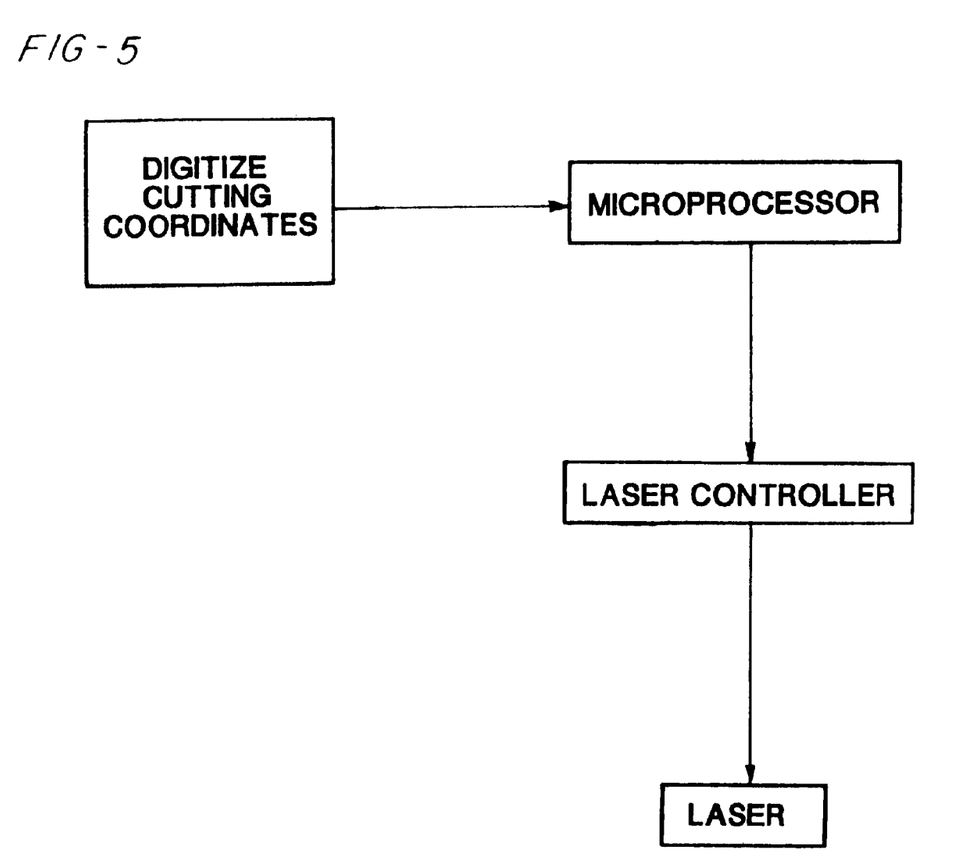
FIG. 5 is a block diagram showing the preferred system for controlling the movement of the laser in accordance with the invention.

FIG. 5 provides a simplified block diagram showing the manner in which the laser is ultimately driven along the desired path to perform its accurate cutting operation on the plurality of paint film laminate workpieces each of which is positioned on its associated convex positioning block.

In accordance with conventional techniques, X, Y, and Z cutting coordinates for the desired cut or trim are provided as input and are digitized. This information is fed as memory to a microprocessor unit that, in turn, provides this information to controller 210 that in turn provides drive input for motors 176, 180, 200, 202, 204 (see FIG. 3).

The manner in which the laser drive is controlled is not an essential part of the invention and, accordingly, the provision of coordinates for the desired cutting pattern and correlated laser drive can be provided by a variety of conventional techniques. Examples of suitable laser control methods are detailed for example in U.S. Pat. No. 5,698,121 (Kosaka et al.); U.S. Pat. No. 4,918,611 (Shyu et al.) and U.S. Pat. No. 5,466,909 (Nihei et al). The disclosures of these patents are incorporated by reference herein.

Figure 6:
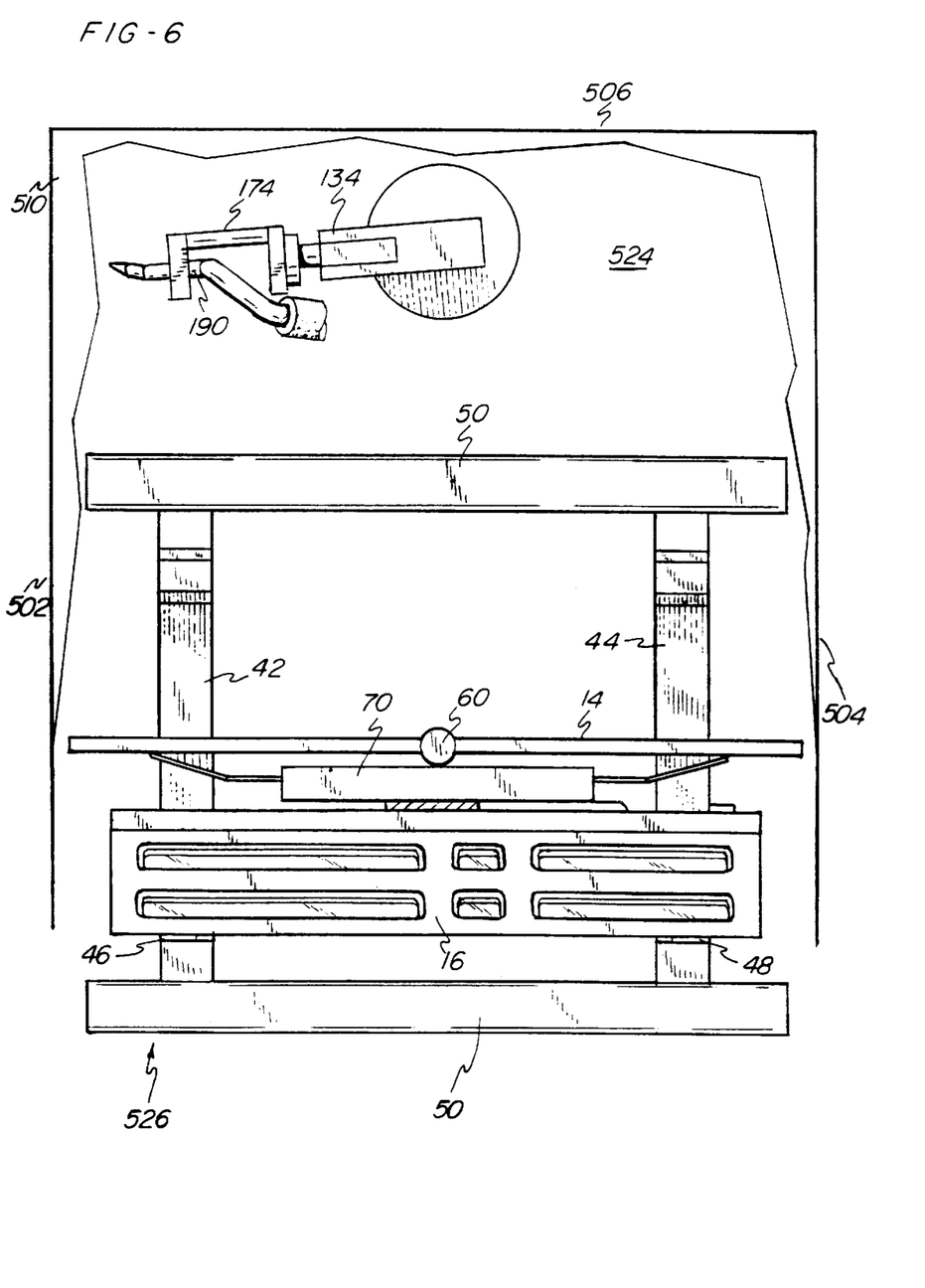
FIG. 6 is a partially cut away top plan view showing the rotatable wall and work platform in the open or loading position wherein the operator may manually load pret-rimmed paint film laminate parts onto the positioning blocks.
Figure 7:
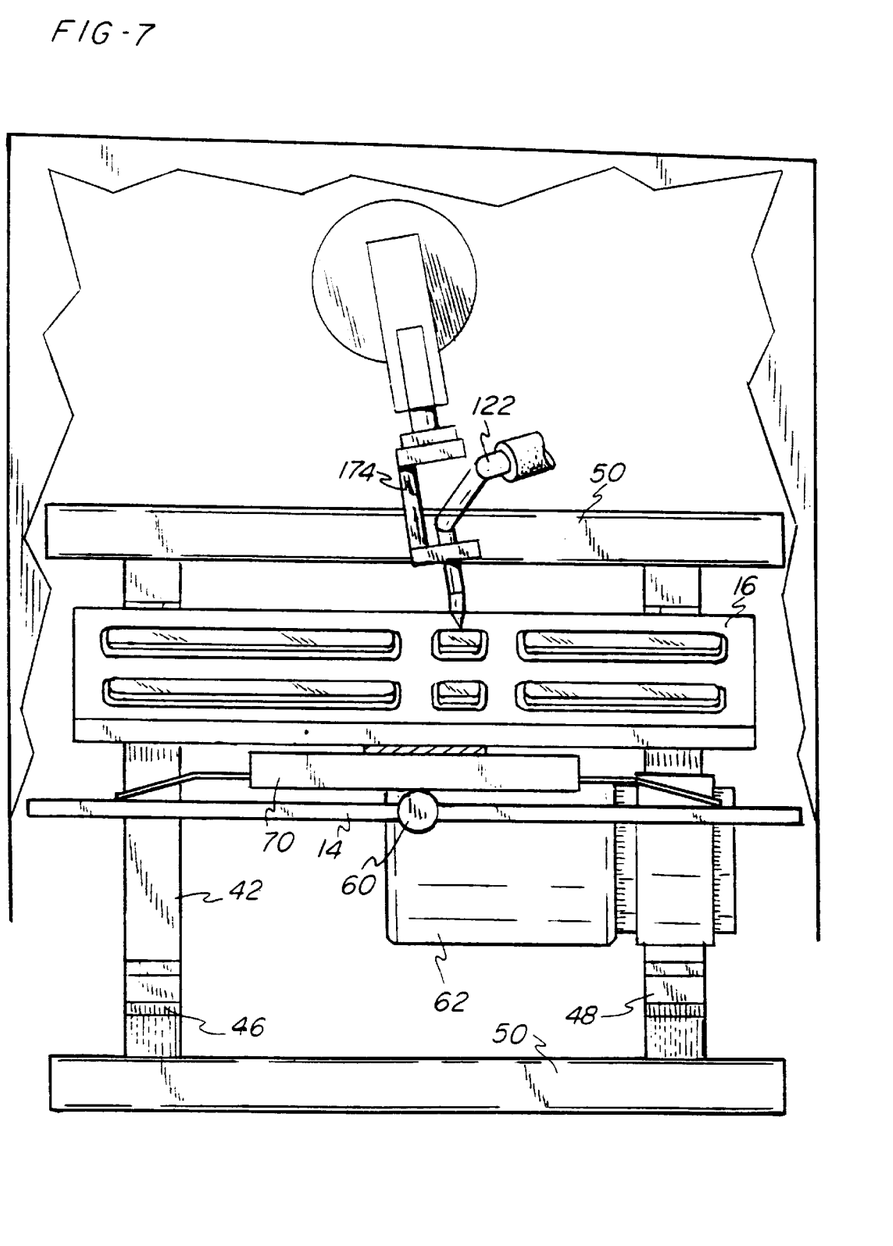
FIG. 7 is a partially cut away top plan view showing the rotatable wall and work platform positioned in the safety enclosure ready for operation of the laser-trimming position.

FIGS. 6 and 7 illustrate a preferred embodiment of the invention in which the wall 14, associated platform 16 and support trusses 42, 44 can be rotated between: (1) a loading and unloading station and (2) the laser trimming station with operation at the laser trimming station proceeding as set forth above. With reference first to FIG. 6, the wall 14 and associated platform 16 are positioned at the loading and unloading station 526. As shown, the assembly is housed by said wall members 502, 504 and end wall member 506, the latter of which defines the end-wise boundary for the laser trimming station 524. The housing is open ended at the loading and unloading zone 526. Roof 510 extends over the assembly from the middle of the side walls to the end wall 506. Accordingly, a closed chamber is provided in the laser trimming station 524. In FIGS. 6 and 7, the roof member 510 is partially broken away. This is necessary to reveal the positioning of the wall and platform in the laser trimming station 524 shown in FIGS. 7 and 8.

In accordance with the inventive methods, the wall 14, platform 16 and associated trusses 42, 44 are first caused to rotate so that the platform 16 is presented in the position shown in FIG. 6. Here, an operator places the preformed and roughly trimmed paint film laminate workpieces over the corresponding convex positioning blocks that are mounted on the work platform. Then, the platform 16 and its associated support mechanisms including the wall 14 and trusses 42, 44 are rotated so that the platform 16 is positioned in the laser trimming station 524 with, as aforementioned, the laser trimming station being enclosed by wall members 502, 504, 506 and roof 510.

While in the enclosed chamber, the laser cutting of the paint film laminate workpieces is performed. As aforementioned, gases and particulates are drawn through the positioning blocks through manifold 20 and chamber 70 to a bag house or other air cleaning station. Accordingly, the entire laser cutting operation is performed in an enclosure so as to shield the work force from the laser beam and the gases and particulates that are formed as an undesirable byproducts of the cutting operation.

After the laser cutting operation is performed, the platform 16 and its associated support mechanisms are rotated back to the position shown in FIG. 6. The operator then unloads the accurately dimensioned laser cut workpieces from the platform, and provides preformed roughly trimmed workpieces over the positioning blocks so that the precise laser trimming cycle can be again commenced.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of trim cutting a thin film laminate workpiece having a thickness of about 0.5 to about 4 mil comprising:
   (a) placing said thin film laminate on a work platform;
   (b) moving said platform to an enclosed housing;
   (c) providing a predetermined cutting path on said thin film laminate;
   (d) positioning a movable laser beam projector in said housing and adjacent said cutting path;
   (e) moving said projector along said predetermined cutting path while projecting photons therefrom, thereby cutting said thin film laminate along said cutting path;
   (f) providing a laser beam capturing groove under said laminate and parallel to said cutting path so that photons passing through said workpiece to perform said cutting will terminate in said groove without reflecting back onto said thin film laminate; and
   (g) providing a vacuum source adjacent said cutting path and under the laminate to draw volatiles and particulates away from said cutting path during said cutting and to help hold said laminate in place on said platform.

* * * * *